United States Patent
Seo (10) Patent No.: US 7,269,115 B2
(45) Date of Patent: Sep. 11, 2007

(54) LASER DIODE POWER CONTROL APPARATUS IN AN OPTICAL DRIVE

(75) Inventor: Jin-gyo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 10/927,522

(22) Filed: Aug. 27, 2004

(65) Prior Publication Data
US 2005/0083820 A1 Apr. 21, 2005

(30) Foreign Application Priority Data
Aug. 28, 2003 (KR) ............... 10-2003-0059831

(51) Int. Cl.
*G11B 7/00* (2006.01)
(52) U.S. Cl. ............... 369/59.11; 369/116; 369/53.22; 369/47.5
(58) Field of Classification Search ............ 369/59.24, 369/59.11, 47.48, 47.5, 116, 53.22, 47.51
See application file for complete search history.

(56) References Cited
U.S. PATENT DOCUMENTS
7,092,346 B2 * 8/2006 Yamamoto ............ 369/116

2002/0114364 A1 8/2002 Seo et al.

FOREIGN PATENT DOCUMENTS
| CN | 1371096 A | 9/2002 |
|---|---|---|
| CN | 1433005 A | 7/2003 |
| EP | 1 329 879 A2 | 7/2003 |

OTHER PUBLICATIONS
First Office Action dated Mar. 9, 2007 issued in the corresponding Chinese Application No. 200410068281.0 (11 pages).

* cited by examiner

Primary Examiner—Nabil Hindi
(74) Attorney, Agent, or Firm—Staas & Halsey LLP (57) ABSTRACT

The invention related to a laser diode power control apparatus in an optical drive capable of driving an optical media by high-speed, which uses a fine-tuning pulse to provide a recording pulse type suitable for high-density optical media. The laser diode power control apparatus includes a pulse generating unit, a control unit, and a transmitting unit. The pulse generating unit generates a recording pulse for each channel. The control unit controls the pulse generating unit by determining whether to apply a fine-tuning pulse to the recording pulse for each channel based on the type of the optical medium and the driving speed of the optical drive for the optical medium. The transmitting unit transmits a power level for each channel according to the recording pulse output from the pulse generating unit.

35 Claims, 6 Drawing Sheets

FIG. 5A
NRZI

FIG. 5B
NEW TYPE1

FIG. 5C
NEW TYPE2

FIG. 5D
NEW TYPE3

FIG. 5E
NEW TYPE4

FIG. 5F
NEW TYPE5

FIG. 5G
NEW TYPE6

LASER DIODE POWER CONTROL APPARATUS IN AN OPTICAL DRIVE

CROSS-REFERENCE TO RELATED APPLICATION

This application claims the priority of Korean Patent Application No. 2003-59831, filed on Aug. 28, 2003, in the Korean Intellectual Property Office, the disclosure of which is incorporated herein in its entirety by reference.

BACKGROUND OF THE INVENTION

1. Field of the Invention

The invention relates to a laser diode power control apparatus in an optical drive, and more particularly, to a laser diode power control apparatus that optimizes a recording pulse for high-density optical media in the optical drive capable of driving the optical media at a high speed.

2. Description of the Related Art

Optical media is typically classified as either a compact disc (CD) or a digital versatile disc (DVD). CD-Recordables (CD-Rs) and CD-Rewritables (CD-RWs) are types of CDs, and DVD-Rs, DVD+RWs, and DVD-Random Access Memories (DVD-RAMs) are types of DVDs. Also, high-density optical media such as Blue-ray DVD discs, are now being developed, which require more advanced recording and reproducing technology.

The driving speed of optical drives is rapidly increasing. For example, in the case of optical drives for CD-Rs, 1× (1 multi-speed) optical drives were released at an early stage, and 52× (52 multi-speed) optical drives are presently being manufactured. Likewise, regarding optical drives for DVDs, 12× or 16× optical drives are being developed. As such, optical drives must be compatible with various optical media and capable of driving at a high speed.

SUMMARY OF THE INVENTION

The invention provides a laser diode power control apparatus in an optical drive capable of driving an optical media at a high-speed, which can provide a recording pulse type suitable for high-density optical media.

The invention also provides a laser diode power control apparatus that provides a recording pulse type suitable for optical media by using a fine-tuning pulse.

According to an aspect of the invention, there is provided a laser diode power control apparatus in an optical drive, the laser diode power control apparatus includes: a pulse generating unit to generate a recording pulse for each of a plurality of channels; a control unit to control the pulse generating unit by determining whether to apply a fine-tuning pulse to the recording pulse for each of the plurality of channels based on the type of an optical medium and the driving speed of the optical drive for the optical medium; and a transmitting unit to transmit a power level for each of the plurality of channels according to the recording pulse output from the pulse generating unit.

The pulse generating unit may include: a recording pulse setting unit to set condition information for generating the recording pulse for each of the plurality of channels based on pulse generation condition information output from the control unit; a plurality of pulse generators included in each of the plurality of channels, respectively, to generate a recording pulse of a corresponding channel based on the condition information provided from the recording pulse setting unit; a fine-tuning pulse generator to generate a fine-tuning pulse based on the condition information provided from the recording pulse setting unit; and a plurality of transmitting units included in each of the plurality of channels, respectively, to selectively transmit a recording pulse and the fine-tuning pulse of a corresponding channel according to the pulse generation condition information output from the control unit.

The pulse generating unit may include: a recording pulse setting unit, which sets a condition information for generating the recording pulse for each of the plurality of channels based on the pulse generation condition information output from the control unit; a plurality of pulse generators included in each of the plurality of channels, respectively, to generate a recording pulse of a corresponding channel according to the condition information output from the recording pulse setting unit; a fine-tuning pulse generator to generate the fine-tuning pulse according to the condition information provided from the recording pulse setting unit; a plurality of gates included in each of the plurality of channels, respectively, to combine the recording pulse and the fine-tuning pulse of the corresponding channel, and transmit the combined pulse; and a plurality of transmitting units included in each of the plurality of channels, respectively, to selectively transmit the recording pulse output from a pulse generator of a corresponding channel and the recording pulse output from a gate of the corresponding channel.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become more apparent by describing in detail embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

The invention is further described below with reference to the accompanying drawings. Throughout the drawings, like reference numerals refer to like elements.

Figure 1:
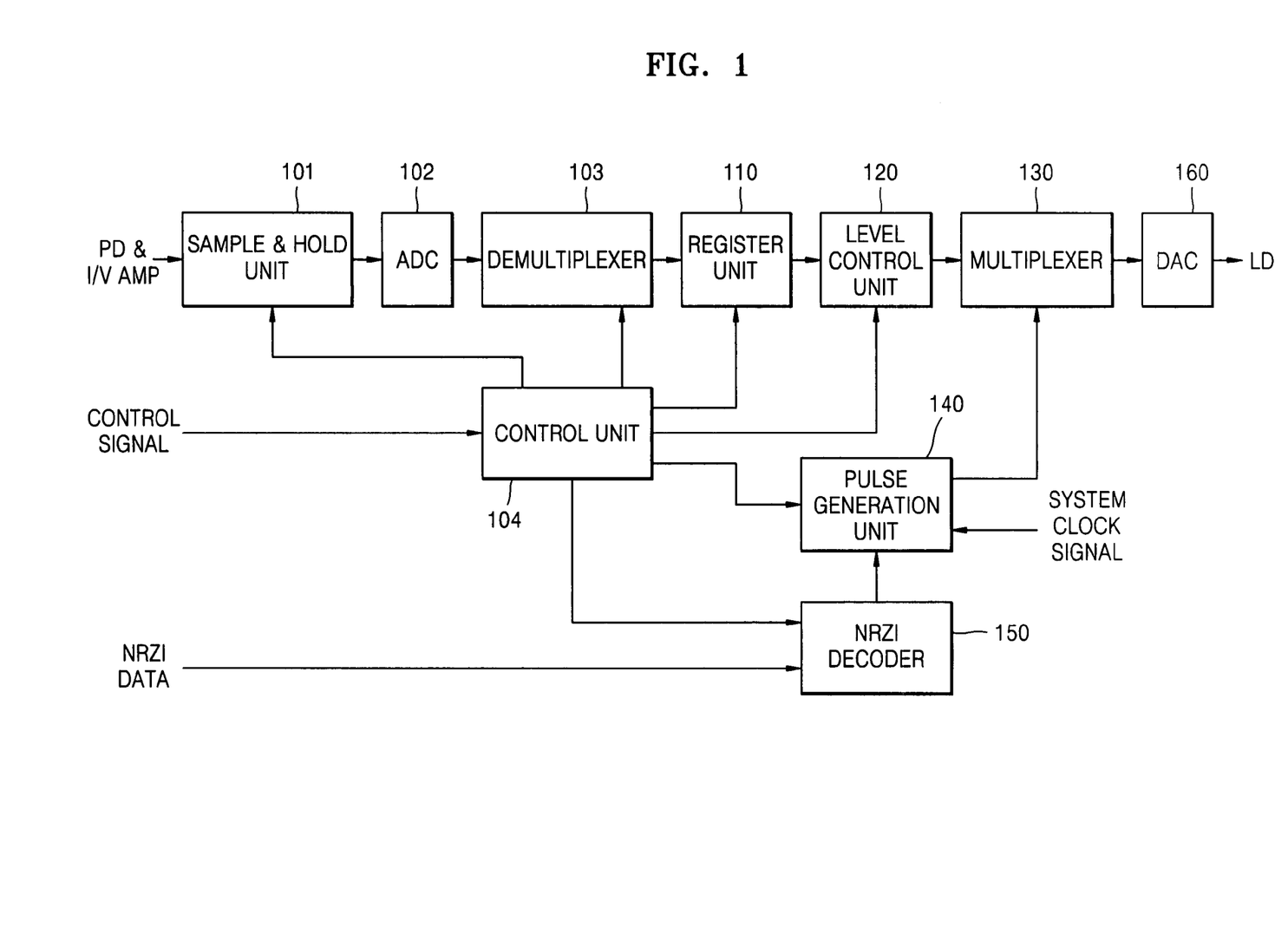
FIG. 1 is a block diagram of a laser diode power control apparatus in an optical drive.

FIG. 1 is a block diagram of a laser diode power control apparatus in an optical drive, according to an aspect of the present invention. Referring to FIG. 1, the laser diode power control apparatus includes a sample & hold unit 101, an analog-to-digital converter (ADC) 102, a demultiplexer 103, a control unit 104, a register unit 110, a level control unit 120, a multiplexer 130, a pulse generating unit 140, a non-return to zero invert (NRZI) decoder 150, and a digital-to-analog converter (DAC) 160.

The sample & hold unit 101 samples a designated section of an input signal and holds the sampled signal. The input signal is obtained by amplifying a signal received by a photo diode (PD) (not shown) to a voltage through a current to voltage amplifier (IN amp) (not shown). The signal received by the PD is an electrical signal that corresponds to light reflected from a medium (not shown) or light received by a front photo diode (FPD). The medium may be an optical medium and/or a recordable and/or reproducible medium.

The ADC 102 converts a signal output from the sample & hold unit 101 into a digital signal and outputs the digital signal. The digital signal is transmitted to the demultiplexer 103.

The demultiplexer 103 demultiplexes the digital signal output from the ADC 102 according to a control signal from the control unit 104 and outputs the demultiplexed signal. The control signal is determined according to a channel used for controlling power of a laser diode. For example, FIG. 1 is a case where 6 channels are used (not shown). In this case, the control signal has a format that can discriminate among the 6 channels. The 6 channels include a first channel, a peak channel, a last channel, an erase channel, a cooling channel, and a bottom channel. If the number of channels used for controlling the power of the laser diode is N, the control signal has a format that can discriminate among N channels. The demultiplexer 103 serves as a transmission unit that transmits a feed-back present power.

The control unit 104 controls the laser diode power control apparatus to set a present power for each channel that is equal to a reference power, based on the type of an optical medium loaded into an optical drive and a driving speed information of the optical drive for the optical medium.

For example, the control unit 104 determines whether the optical medium is rewritable, recordable, and/or whether it is high-density, determines the driving speed of the optical drive based on the input control signal, and controls the laser diode power control apparatus based on the results of these determinations. The control signal may be provided from a main control unit (not shown) of the optical drive (not shown).

The control unit 104 controls and determines the designated section of the signal sampled by the sample & hold unit 101 according to the type and driving speed of the optical drive. The control unit 104 can also control the designated section by considering the channel used for controlling the power of the laser diode.

The control unit 104 controls the demultiplexer 103, so that present power for each channel can be transmitted from the demultiplexeer 103 to a corresponding register of the register unit 110.

The control unit 104 also provides a reference power for each channel used in the register unit 110. The reference power may be set differently according to the type of the optical medium loaded into the optical drive and driving speed of the optical drive. The reference power for each channel may be a preset value.

The control unit 104 provides a power level control condition for each channel to the level control unit 120. The power level control condition is determined by the type of the optical medium and the driving speed of the optical drive. For example, the power level control condition may be set in such a way that the level is controlled according to the difference between the reference power and the present power, or the difference between the reference power and the present power is discriminatingly applied to prevent ringing.

When it is determined which power level is to be finely controlled and which pulse type is to be used based on the type of the optical medium and the driving speed of the optical drive, the control unit 104 provides determined pulse generation condition information to the pulse generating unit 140.

The power level to which a fine-tuning pulse can be applied is defined as follows.

TABLE 1

| | Fine-tuning pulse applicable power level |
|---|---|
| Level 1 | Apply fine-tuning pulse to erase 1 level |
| Level 2 | Apply fine-tuning pulse to write level |
| Level 3 | Apply fine-tuning pulse to bottom level |

Selectable fine-tuning pulse types may be defined as shown below.

TABLE 2

| | Level type | Period |
|---|---|---|
| Pulse type 1 | Apply on-start fine-tuning pulse | 1Tw or 2Tw |
| Pulse type 2 | Apply off-start fine-tuning pulse | 1Tw or 2Tw |

In Table 2, the on-start fine-tuning pulse is a pulse type having a fine-tuning pulse train that begins with logic high in a channel clock. The off-start fine-tuning pulse is a pulse type having a fine-tuning pulse train that begins with logic low in the channel clock.

The control unit 104 provides information regarding the type of the optical medium and the driving speed of the optical drive to the NRZI decoder 150.

Figure 2:
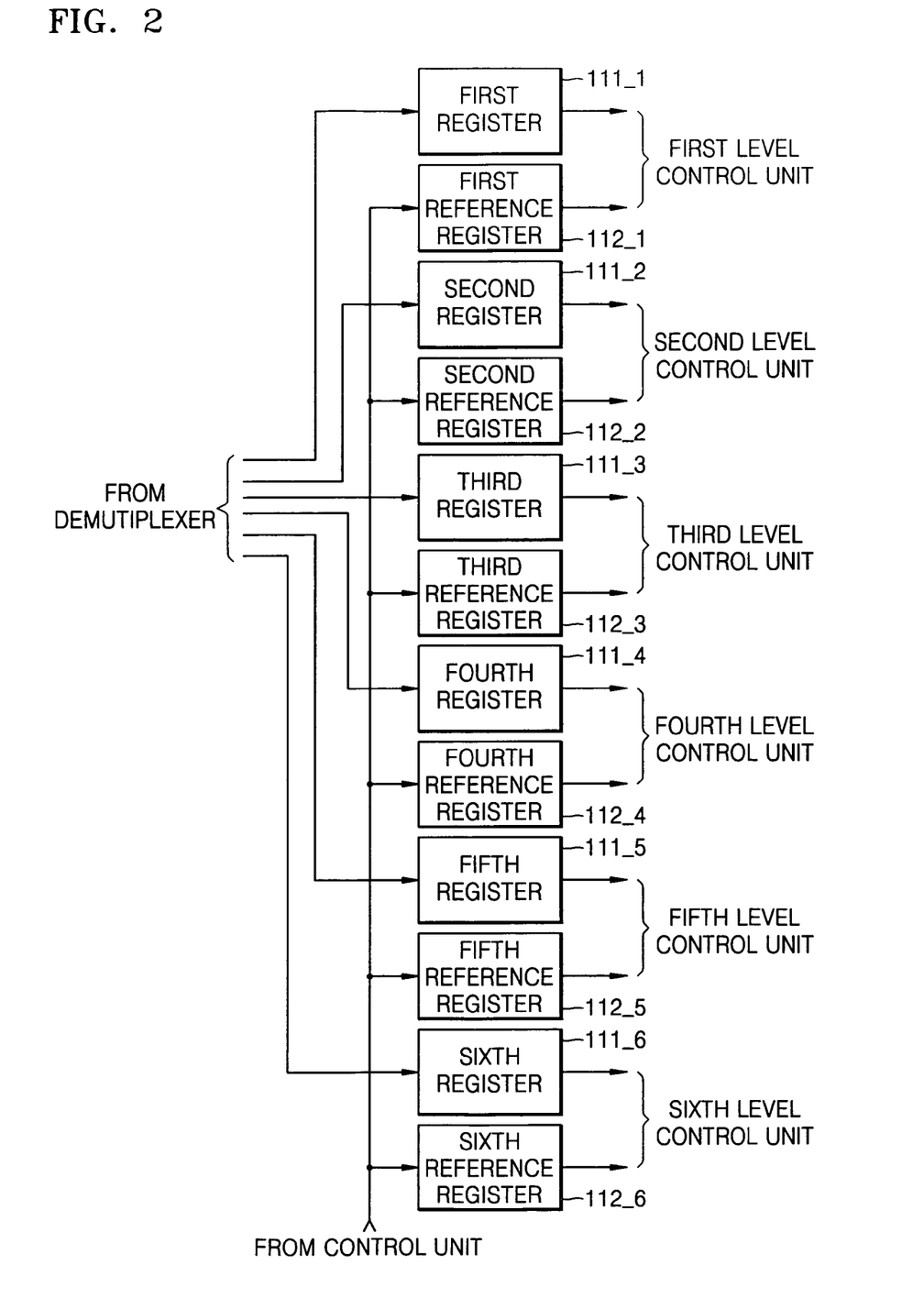
FIG. 2 is a detailed block diagram of a register unit of FIG. 1.

The register unit 110 includes first through sixth registers 111_1 through 111_6 that store a feed-back preset power level for each channel, which is output from the demultiplexer 103. The register unit 110 further includes first through sixth reference registers 112_1 through 112_6 that store a reference power level for each corresponding channel. The number of registers included in the register unit 110 is determined by the number of channels used for controlling the power of the laser diode. For example, if N channels are used, the register unit 110 includes N registers and N reference registers.

The reference power level for each channel stored in the first through sixth reference registers 112_1 through 112_6 is provided from the control unit 104. The first through sixth registers 111_1 through 111_6 provide the present power level for each channel to a corresponding level control unit in the level control unit 120.

Figure 3:
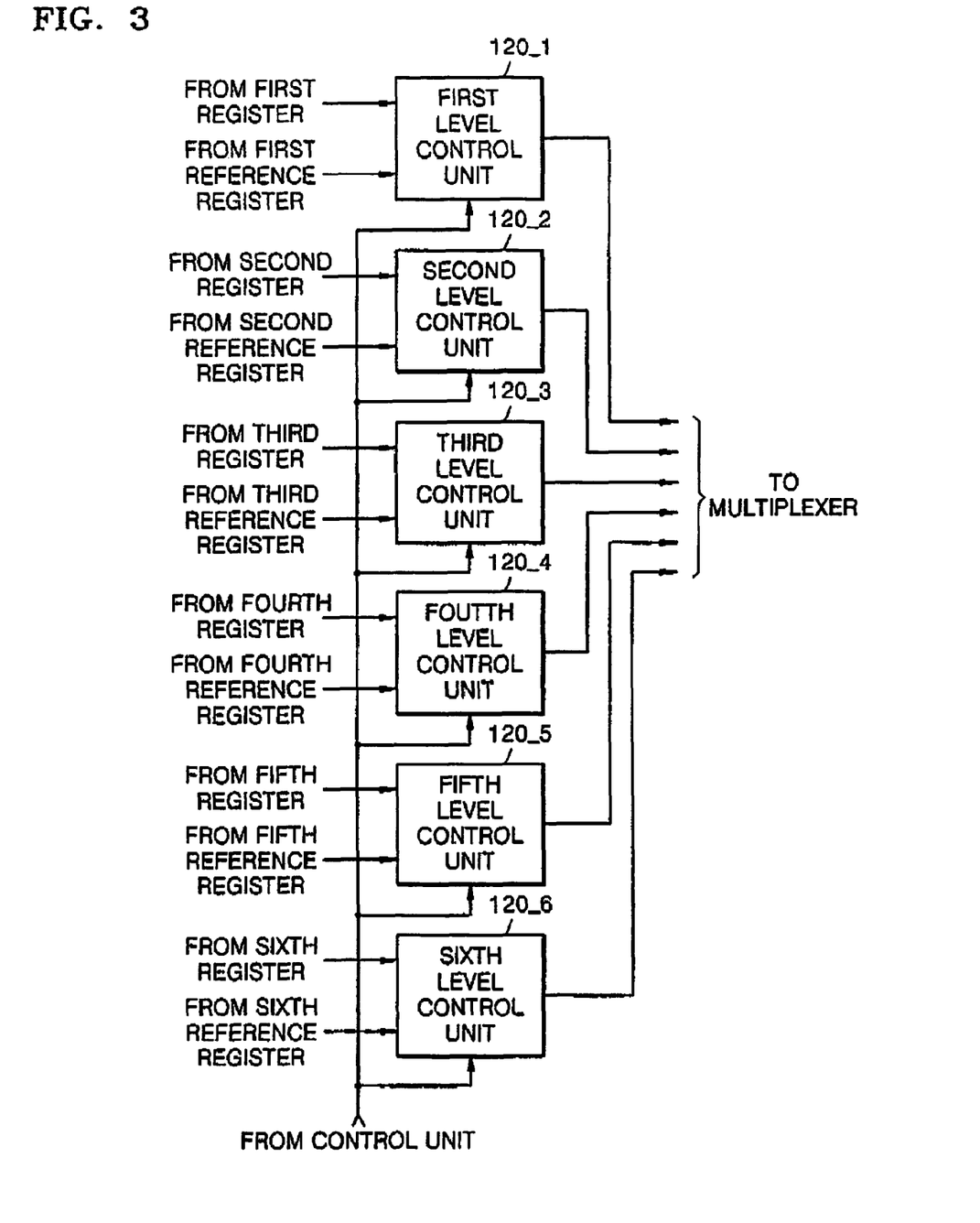
FIG. 3 is a detailed block diagram of a level control unit of FIG. 1.

The level control unit 120 includes first through sixth level control units 120_1 through 120_5 as shown in FIG. 3. The first register 111_1 provides the stored present power level to the first level control unit 120_1. The second register 111_2 provides the stored present power level to the second level control unit 120_2. The third register 111_3 provides the stored present power level to the third level control unit 120_3. The fourth register 111_4 provides the stored present power level to the fourth level control unit 120_4. The fifth register 111_5 provides the stored present power level to the fifth level control unit 120_5. The sixth register provides the stored present power level to the sixth level control unit 120_6.

Referring to FIGS. 2 and 3, the first reference register 112_1 provides the stored reference power level to the first level control unit 120_1. The second reference register 112_2 provides the stored reference power level to the second level control unit 120_2. The third reference register 112_3 provides the stored reference power level to the third level control unit 120_3. The fourth reference register 112_4 provides the stored reference power level to the fourth level control unit 120_4. The fifth reference register 112_5 provides the stored reference power level to the fifth level control unit 120_5. The sixth reference register 112_6 provides the stored reference power level to the sixth level control unit 120_6.

Each of the first through sixth level control units 120_1 through 120_6 detects a difference between present power level and a reference power level output from a corresponding register of the register unit 110, controls and outputs the level of a corresponding channel based on the detected difference and the power level control condition provided from the control unit 104, and transmits an output signal to the multiplexer 130.

The multiplexer 130 selectively transmits signals output from the first through sixth level control units 120_1 through 120_6 according to the control signal provided from the pulse generating unit 140. The multiplexer 130 serves as a transmitting unit that transmits a power level for each channel according to a recording pulse output from the pulse generating unit 140.

The pulse generating unit 140 generates a recording pulse for each channel based on pulse generation condition information and a channel clock signal that are output from the control unit 104, and a signal output from the NRZI decoder 150, and provides a generated recording pulse as a signal for controlling the operation of the demultiplexer 130.

Figure 4:
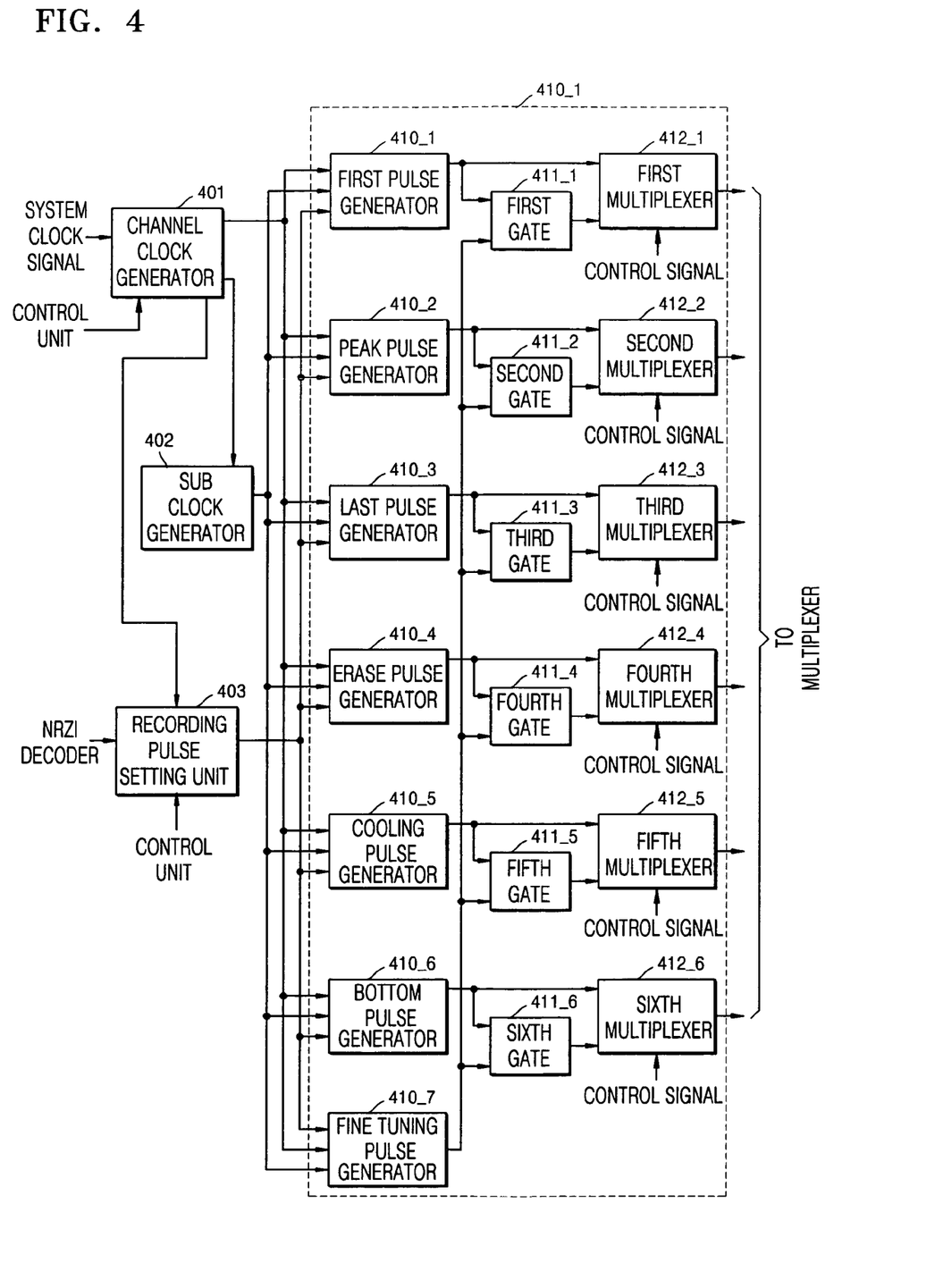
FIG. 4 is a detailed block diagram of a pulse generating unit of FIG. 1.

FIG. 4 is a detailed block diagram of the pulse generating unit 140 of FIG. 1. Referring to FIG. 4, the pulse generating unit 140 includes a channel clock generator 401, a sub clock generator 402, a recording pulse setting unit 403, and a pulse generating unit 410.

When a system clock signal or a divided channel clock signal is input, the channel clock generator 401 generates an original channel clock signal that is suitable for the type of the optical medium loaded into the optical drive and recording speed of the optical drive on the optical medium, based on information about the type of the optical medium that is provided from the control unit 104. As such, the channel clock generator 401 may multiply the input system clock signal by a predetermined number.

The sub clock generator 402 generates a clock signal that is obtained by multiplying or phase-delaying the original clock signal output from the channel clock generator 401 to accurately control synchronization for each channel.

The recording pulse setting unit 403 performs condition setting and initialization for generating a recording pulse suitable for the type of the optical medium based on decoded NRZI data provided from the NRZI decoder 150, the clock signal provided from the channel clock generator 401, and the pulse generation condition information provided from the control unit 104.

The recording pulse setting unit 403 sets start times and end times of at least the first pulse, the peak pulse, the last pulse, the erase pulse, the cooling pulse, and the bottom pulse, and the type and period of the fine-tuning pulse. Setting the period of the fine-tuning pulse indicates setting the period of the fine-tuning pulse to 1Tw or 2Tw. A recording pulse generation condition set in the recording pulse setting unit 403 is provided to pulse generators 410_1 through 410_7 in the pulse generating unit 410.

The pulse generating unit 410 includes at least a plurality of pulse generators, a plurality of gates, and a plurality of multiplexers, and generates a recording pulse for each channel.

The plurality of pulse generators independently generates pulses required for generating the recording pulse for each channel. To this end, the plurality of pulse generators is formed independently for each channel. For example, the plurality of pulse generators includes a first pulse generator 410_1, a peak pulse generator 410_2, a last pulse generator 410_3, an erase pulse generator 410_4, a cooling pulse generator 410_5, and a bottom pulse generator 410_6. In particular, the plurality of pulse generators may further include a fine-tuning pulse generator 410_7.

Each of the plurality of pulse generators generates a corresponding pulse based on the recording pulse generation condition information provided from the recording pulse setting unit 403 and the clock signals provided from the channel clock generator 401 and the sub clock generator 402.

A plurality of gates combines fine-tuning pulses generated from a corresponding pulse generator and a corresponding fine-tuning pulse generator and outputs the resultant signal. Thus, recording pulses output from the gates may have formats in which the fine-tuning pulse is applied to the remaining section except for a section of a corresponding channel, as shown in FIG. 5D or 5G. The section in FIG. 5D or 5G is an overdrive section. In other words, the plurality of gates is intended to consider a case where a fine-tuning pulse is only applied to a section of a power channel. The plurality of gates includes first through sixth gates 411_1 through 411_6.

The plurality of multiplexers selectively outputs signals output from a corresponding pulse generator and a corresponding gate. To this end, the plurality of multiplexers includes first through sixth multiplexers 412_1 through 412_6. Signals that control operations of the first through sixth multiplexers 412_1 through 412_6 are provided from the control unit 104. Signals output from the first through sixth multiplexers 412_1 through 412_6 are provided to the multiplexer 130.

The NRZI decoder 150 decodes the input NRZI data and provides the decoded NRZI data to the pulse generating unit 140. In other words, the NRZI decoder 150 determines a detection condition for the NRZI data based on information for the type of the optical medium and driving speed of the optical drive that are provided from the control unit 104, detects recording mark information of the input NRZI data, information about combination of the recording mark and the previous space size, and information about the recording mark and the next space size based on the determined detection condition, and provides the detected information to the pulse generating unit 140.

The DAC 160 converts a signal output from the multiplexer 130 into an analog signal and provides the analog signal as a recording power for driving a laser diode (not shown). Thus, the laser diode may generate a recording pulse as shown in FIGS. 5A through 5G.

FIGS. 5A through 5G illustrate an example of a recording pulse type that can be generated in the laser diode (not shown) by a laser diode power control apparatus according to the invention.

Figure 5A:
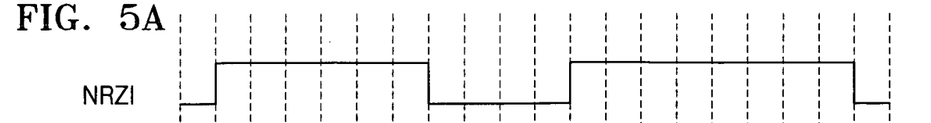
FIG. 5 illustrates a recording pulse type that can be generated in a laser diode by a laser diode power control apparatus.
Figure 5B:
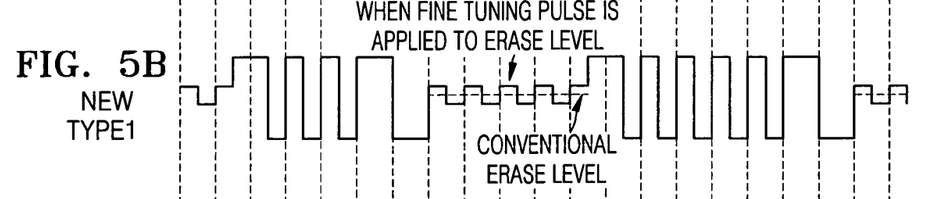
Figure 5C:
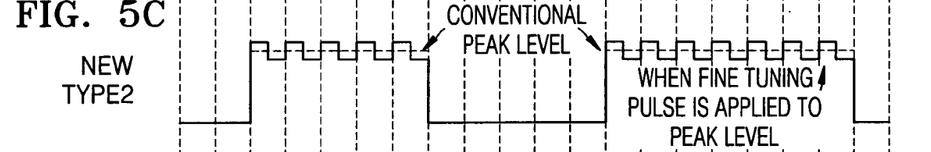
Figure 5D:
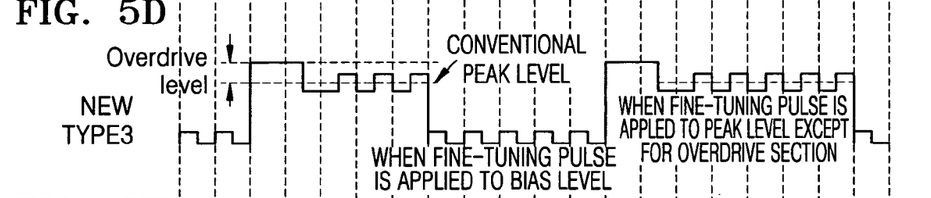
Figure 5E:
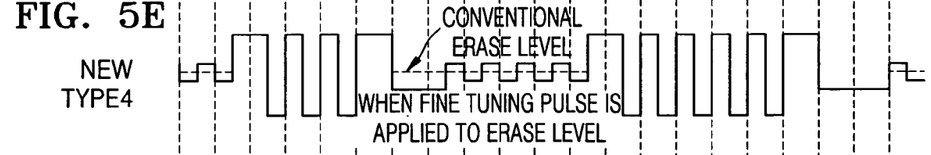
Figure 5F:
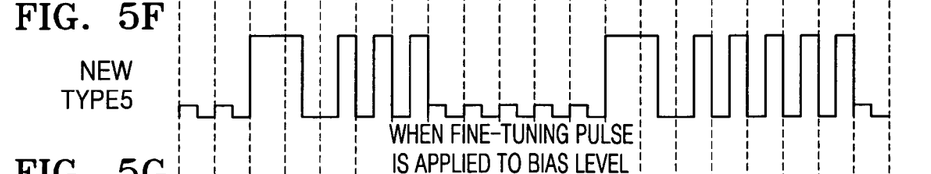
Figure 5G:
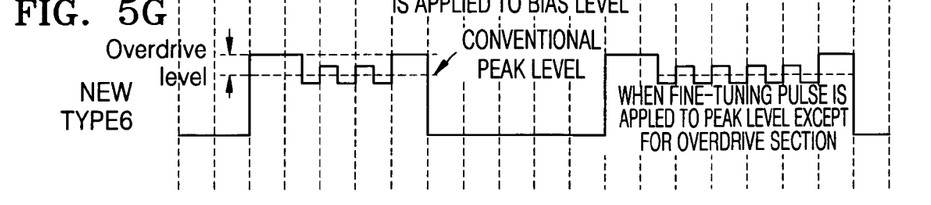

In other words, with respect to NRZI data input as shown in FIG. 5A, FIG. 5B is an example where the on-start fine-tuning pulse is applied to the erase power level, FIG. 5C is an example where the on-start fine-tuning pulse is applied to the peak power level, FIG. 5D is an example where the off-start fine-tuning pulse is applied to the peak power level having the overdrive section, FIG. 5E is an example where the off-start fine-tuning pulse is applied to the erase power level, FIG. 5F is an example where the on-start fine-tuning pulse is applied to the bias power level, and FIG. 5G is an example where the off-start fine-tuning pulse is applied to the peak power level whose start and end sections are overdrive sections and the off-start fine-tuning pulse is not applied to the overdrive sections.

As shown in FIGS. 5A through 5G, to apply the fine-tuning pulse to the erase power level, the peak power level, the bias power level, the plurality of power levels, and the peak power level except for the overdrive sections, the control unit 104 controls operations of the recording pulse setting unit 403 and the first through sixth multiplexers 412_1 through 412_6.

Figure 6A:
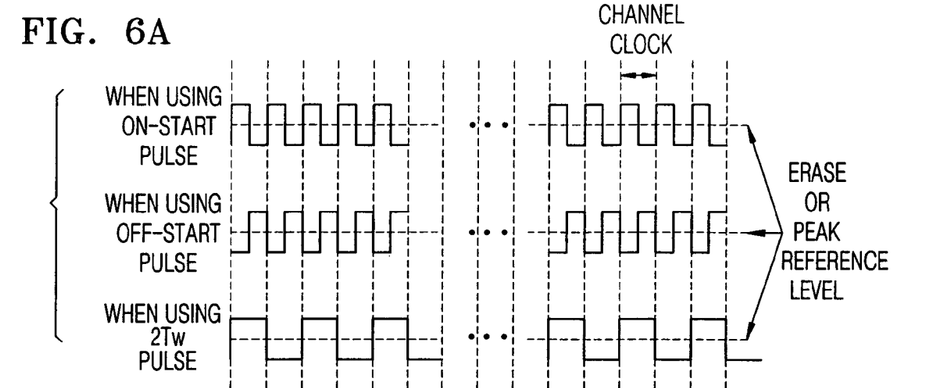
FIG. 6 illustrates a fine-tuning pulse type that can be generated in a fine-tuning pulse generator of FIG. 4.
Figure 6B:
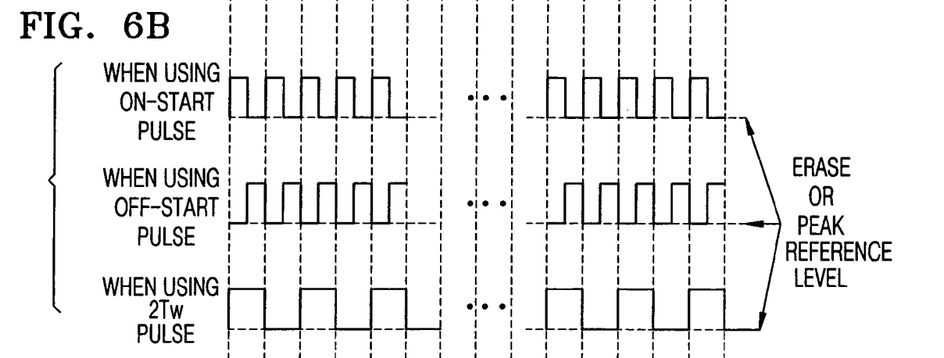
Figure 6C:
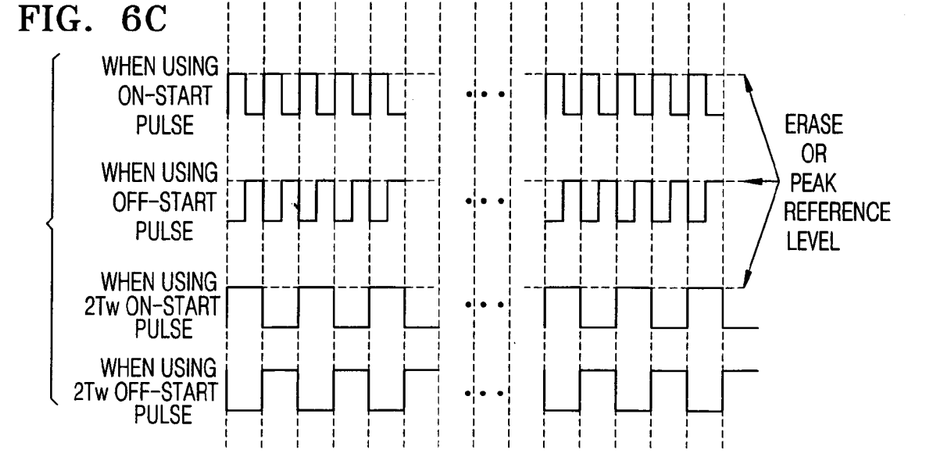

FIGS. 6A through 6C illustrate a fine-tuning pulse type that can be generated in the pulse generator 410_7 of FIG. 4. FIG. 6A is an example where the on-start fine-tuning pulse, the off-start pulse, and the fine-tuning pulse having a period of 2Tw are used when the erase or peak reference level is used as a center level.

FIG. 6B is an example where the on-start fine-tuning pulse, the off-start fine-tuning pulse, and the fine-tuning pulse having a period of 2Tw are used when the erase or peak reference level is used as a bottom level.

FIG. 6C is an example where the on-start fine-tuning pulse, the off-start fine-tuning pulse, the off-start fine-tuning pulse having a period of 2Tw, and the on-start fine-tuning pulse having a period of 2Tw are used when the erase or peak reference level is used as a top level.

The pulse generator 410_7 selectively creates a fine-tuning pulse as shown in FIGS. 6A through 6C based on the recording pulse generation condition information provided from the recording pulse setting unit 403.

As described above, the power of a laser diode is controlled by selectively applying the fine-tuning pulse, such as a multi pulse train or a multi pulse chain, according to the type of an optical medium. Thus, it is possible to create a recording pulse optimized for a disc drive that is capable of driving an optical medium by high-speed and high-density optical media and provide a high-speed optical drive that is reliable and compatible with high-density optical media.

In particular, it is possible to prevent heat from accumulating by applying a fine-tuning pulse to a recording pulse of a non-multi type or a flat channel and to improve jitter when a rewritable optical medium is direct-overwrite (DOW) tested.

In addition, the laser diode power apparatus according to the invention is embodied together with a laser diode driver as a single body and is used in an optical drive that can be integrated on a pickup, and thus, it is possible to reduce noise and interference in a present power level feed back through a photo diode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A laser diode power control apparatus in an optical drive, the laser diode power control apparatus comprising:
a pulse generating unit to generate a recording pulse for each of a plurality of channels;
a control unit to control the pulse generating unit by determining whether to apply a fine-tuning pulse to the recording pulse for each of the plurality of channels according to a type of an optical medium and a driving speed of the optical drive for the optical medium; and
a transmitting unit to transmit a power level for each of the plurality of channels according to the generated recording pulse.

2. The laser diode power control apparatus as claimed in claim 1, wherein when the type of the optical medium is a high-density optical medium and the driving speed of the optical medium is high, the control unit applies the fine-tuning pulse to at least one of the plurality of channels.

3. The laser diode power control apparatus as claimed in claim 2, wherein the control unit applies the fine-tuning pulse to a section of the recording pulse of a corresponding channel from at least one of the plurality of channels.

4. The laser diode power control apparatus as claimed in claim 3, wherein another section of the recording pulse that does not include the section of the recording pulse of the corresponding channel is an overdrive section.

5. The laser diode power control apparatus as claimed in claim 2, wherein the control unit applies the fine-tuning pulse to an entire section of the recording pulse of the corresponding channel.

6. The laser diode power control apparatus as claimed in claim 2, wherein the control unit sets a reference level of a corresponding channel to one of a first level, a second level, and a third level of the fine-tuning pulse.

7. The laser diode power control apparatus as claimed in claim 2, wherein the control unit sets a type of the fine-tuning pulse according to a period of the fine-tuning pulse and whether the fine-tuning pulse is used as an on-start pulse or an off-start pulse.

8. The laser diode power control apparatus as claimed in claim 1, wherein the pulse generating unit comprises:
a recording pulse setting unit to set condition information for generating the recording pulse for each of the plurality of channels according to pulse generation condition information output from the control unit;
a plurality of pulse generators, included in each of the plurality of channels, respectively, to generate a recording pulse of a corresponding channel according to the condition information provided from the recording pulse setting unit;
a fine-tuning pulse generator to generate the fine-tuning pulse according to the condition information provided from the recording pulse setting unit; and
a plurality of transmitting units included in each of the plurality of channels, respectively, to selectively transmit a recording pulse and the fine-tuning pulse of a corresponding channel according to the pulse generation condition information output from the control unit.

9. The laser diode power control apparatus as claimed in claim 1, wherein the pulse generating unit comprises:
a recording pulse setting unit to set condition information for generating the recording pulse for each of the plurality of channels according to pulse generation condition information output from the control unit;
a plurality of pulse generators included in each of the plurality of channels, respectively, to generate a recording pulse of a corresponding channel according to the condition information provided from the recording pulse setting unit;

a fine-tuning pulse generator to generate the fine-tuning pulse according to the condition information provided from the recording pulse setting unit;

a plurality of gates included in each of the plurality of channels, respectively, to combine the recording pulse and the fine-tuning pulse of the corresponding channel, and transmit the combined pulse; and a plurality of transmitting units included in each of the plurality of channels, respectively, to selectively transmit the recording pulse output from a pulse generator of a corresponding channel and the recording pulse output from a gate of the corresponding channel.

10. The laser diode power control apparatus as claimed in claim 9, wherein the recording pulse output from the gate of the corresponding channel is formed such that the fine-tuning pulse is applied to a section of the recording pulse of the corresponding channel that does not include another section of the recording pulse of the corresponding channel.

11. The laser diode power control apparatus as claimed in claim 6, wherein the first level is a center level, the second level is a bottom level, and the third level is a top level of the fine-tuning pulse.

12. The laser diode power control apparatus as claimed in claim 1, wherein the plurality of channels comprises at least one of a first channel, a peak channel, a last channel, an erase channel, a cooling channel, and a bottom channel.

13. The laser diode power control apparatus as claimed in claim 8, wherein the plurality of pulse generators includes at least one of a first pulse generator, a peak pulse generator, a last pulse generator, an erase pulse generator, a cooling pulse generator, and a bottom pulse generator.

14. The laser diode power control apparatus as claimed in claim 9, wherein the plurality of pulse generators includes at least one of a first pulse generator, a peak pulse generator, a last pulse generator, an erase pulse generator, a cooling pulse generator, and a bottom pulse generator.

15. The laser diode power control apparatus as claimed in claim 1, wherein the control unit controls to set a present power level for each of the plurality of channels that relates to a reference power according to the type of medium and the driving speed of the optical drive.

16. The laser diode power control apparatus as claimed in claim 1, further comprising a level control unit to detect a difference between a present power level and a reference power level for a channel, control the level of power, and output the controlled level of the channel according to the detected difference and a power level control by the control unit.

17. The laser diode power control apparatus as claimed in claim 14, wherein the control unit provides the power level control for each channel to the level control unit, such that the power level control is set according to a difference between the reference power and the present power.

18. The laser diode power control apparatus as claimed in claim 1, further comprising:

a register unit having a plurality of registers corresponding to the plurality of channels, wherein the control unit controls to provide a reference power for each channel, wherein the control unit provides a reference power for each channel used in the register unit according to the type of medium and the driving speed of the optical drive.

19. The laser diode power control apparatus as claimed in claim 1, further comprising a NRZI decoder to decode input NRZI data and determine a detection condition for the NRZI data according to the type of medium and the driving speed of the optical drive, and provide information regarding the detected condition to the pulse generating unit.

20. The laser diode power control apparatus as claimed in claim 19, wherein the information regarding the detected condition for the NRZI data is determined according to information provided by the control unit about the type of the medium and the speed of the optical drive, information about a recording mark of the input NRZI data, information about a combination of the recording mark and a previous space size, and information about the recording mark and a next space size according to the detection condition.

21. The laser diode power control apparatus as claimed in claim 8, wherein the pulse generating unit comprises a pulse generator to selectively generate the fine-tuning pulse based on the recording pulse generation condition information provided from the recording pulse setting unit.

22. The laser diode power control apparatus as claimed in claim 9, wherein the pulse generating unit comprises a pulse generator to selectively generate the fine-tuning pulse based on the recording pulse generation condition information provided from the recording pulse setting unit.

23. A laser diode power control apparatus in a drive, the laser diode power control apparatus comprising:

a control unit to receive a control signal and determine a type of the medium and a driving speed of the drive, set a present power level for each of a plurality of channels that relates to a reference power according to the type of medium and the driving speed of the drive, and control a designated section of an input signal;

a register unit having a plurality of registers corresponding to the plurality of channels, each of the registers including present power and the reference power for a corresponding channel of the plurality of channels;

a level control unit to detect a difference between the present power level and the reference power level for each channel, control the level of power, and output the controlled level according to the detected difference and a power level control by the control unit, a pulse generating unit to generate a recording pulse for each of a plurality of channels; and a transmitting unit to transmit a power level for each of the plurality of channels according to the respective generated recording pulse for each of the plurality of channels, wherein the control unit controls the pulse generating unit by determining whether to apply a fine-tuning pulse to the recording pulse for each of the plurality of channels according to the medium type and the driving speed of the drive.

24. The laser diode power control apparatus in the drive as claimed in claim 23, further comprising:

a sample unit to sample and hold a designated section of the input signal, wherein the control unit controls the designated section of the signal sampled by the sample unit according to the medium type and driving speed of the drive.

25. The laser diode power control apparatus in the drive as claimed in claim 23, wherein the control unit controls so that the present power for each of the plurality of channels is transmitted to a corresponding register in the register unit.

26. The laser diode power control apparatus in the drive as claimed in claim 23, wherein when the type of the medium is a high-density optical medium and the driving speed of the medium is high, the control unit applies the fine-tuning pulse to at least one of the plurality of channels.

27. The laser diode power control apparatus in the drive as claimed in claim 26, wherein the control unit applies the fine-tuning pulse to a section of the recording pulse of a corresponding channel from at least one of the plurality of channels.

28. A method of controlling power of a laser diode in an optical drive, comprising:
   generating a recording pulse for each of a plurality of channels used for controlling the power of the laser diode;
   controlling the recording pulse generating by determining whether to apply a fine-tuning pulse to the recording pulse for each of the plurality of channels according to a type of an optical medium and a driving speed of the optical drive; and
   transmitting a power level for each of the plurality of channels according to the generated recording pulse.

29. The method of controlling power of the laser diode in the optical drive as claimed in claim 28, further comprising:
   applying the fine-tuning pulse to at least one of the plurality of channels when the type of the optical medium is a high-density optical medium and the driving speed of the optical drive is high.

30. The method of controlling power of the laser diode in the optical drive as claimed in claim 29, further comprising:
   applying the fine-tuning pulse to a section of the recording pulse of a corresponding channel from at least one of the plurality of channels.

31. The method of controlling power of the laser diode in the optical drive as claimed in claim 30, wherein another section of the recording pulse that does not include the section of the recording pulse of the corresponding selected channel is an overdrive section.

32. The method of controlling power of the laser diode in the optical drive as claimed in claim 29, further comprising:
   setting a reference level of a corresponding channel to one of a first level, a second bottom level, and a top third level of the fine-tuning pulse.

33. The method of controlling power of the laser diode in the optical drive as claimed in claim 32, wherein the first level is a center level, the second level is a bottom level, and the third level is a top level of the fine-tuning pulse.

34. An optical drive apparatus for controlling power of a laser diode by selectively applying a fine-tuning pulse according to a type of an optical medium and drive speed of the optical drive, comprising:
   a first unit to generate a recording pulse for each of a plurality of channels used for controlling the power of the laser diode;
   a second unit to transmit a power level for each of the plurality of channels according to the generated recording pulse; and
   a control unit to receive a control signal, determine the type of the optical medium and the drive speed of the optical drive from the received control signal, and control the first unit by determining whether to apply the fine-tuning pulse to the recording pulse for each of the plurality of channels according to the type of the optical medium and the driving speed of the optical drive.

35. The optical drive apparatus for controlling power of the laser diode as claimed in claim 34, wherein the control unit applies the fine-tuning pulse to at least one of the plurality of channels when the type of the type of the optical medium is a high-density optical medium and the driving speed of the optical drive is high.

\* \* \* \* \*

UNITED STATES PATENT AND TRADEMARK OFFICE
CERTIFICATE OF CORRECTION

PATENT NO.      : 7,269,115 B2  Page 1 of 1
APPLICATION NO. : 10/927522
DATED           : September 11, 2007
INVENTOR(S)     : Jin-gyo Seo It is certified that error appears in the above-identified patent and that said Letters Patent is hereby corrected as shown below:

Column 12, Line 31, after "type of the" delete "type of the" (Second Occurrence).

Signed and Sealed this

Eleventh Day of March, 2008

JON W. DUDAS
*Director of the United States Patent and Trademark Office*